US010222465B2

United States Patent
Feigin

(10) Patent No.: US 10,222,465 B2
(45) Date of Patent: Mar. 5, 2019

(54) MAGNETIC FIELD DETECTOR AND GROUND-PENETRATING RADAR DEVICE WITH MERGED DISPLAY

(71) Applicant: Geophysical Survey Systems, Inc., Salem, NH (US)

(72) Inventor: Jeffrey R Feigin, Andover, MA (US)

(73) Assignee: Geophysical Survey Systems, Inc., Nashua, NH (US)

( * ) Notice: Subject to any disclaimer, the term of this patent is extended or adjusted under 35 U.S.C. 154(b) by 597 days.

(21) Appl. No.: 14/982,515

(22) Filed: Dec. 29, 2015

(65) Prior Publication Data

US 2017/0184717 A1    Jun. 29, 2017

(51) Int. Cl.
| | |
|---|---|
| *G01S 13/86* | (2006.01) |
| *G01S 13/88* | (2006.01) |
| *G01S 7/06* | (2006.01) |
| *G01S 13/87* | (2006.01) |

(52) U.S. Cl.
CPC .............. *G01S 13/86* (2013.01); *G01S 7/062* (2013.01); *G01S 13/87* (2013.01); *G01S 13/885* (2013.01)

(58) Field of Classification Search
CPC ............................... G01S 13/86; G01S 13/885
USPC .......................................................... 342/22
See application file for complete search history.

(56) References Cited

U.S. PATENT DOCUMENTS

| | | | |
|---|---|---|---|
| 6,031,482 A | 2/2000 | Lemaitre et al. | |
| 7,113,124 B2 | 9/2006 | Waite | |
| 7,629,918 B2 | 12/2009 | Brown et al. | |
| 8,188,745 B2 | 5/2012 | Overby et al. | |
| 8,742,747 B2 | 6/2014 | Pearson | |
| 8,872,626 B2 | 10/2014 | Haddy | |
| 8,949,042 B1 | 2/2015 | Goroshevskiy et al. | |
| 9,158,024 B2 | 10/2015 | Overby et al. | |
| 2006/0036376 A1* | 2/2006 | Gudmundsson | G01V 3/081 702/38 |
| 2012/0232800 A1* | 9/2012 | Overby | G01V 3/12 702/7 |
| 2013/0113648 A1* | 5/2013 | Duvoisin, III | G01S 13/887 342/22 |
| 2014/0022117 A1* | 1/2014 | Cist | G01S 7/04 342/176 |

* cited by examiner

Primary Examiner — Peter M Bythrow
Assistant Examiner — Helena H Seraydaryan
(74) Attorney, Agent, or Firm — Michael J. Feigin, Esq.; Feigin and Fridman LLC

(57) ABSTRACT

In an embodiment of the disclosed technology, a visual output of data from a ground-penetrating radar and magnetic field measuring device is displayed on a visual medium. The display has a first exhibition of output from the ground-penetrating radar device and a second from a magnetic field measuring device, such as a very low frequency (VLF) receiver. Using an identical axis, such as an X-axis measuring time or distance, output of each device is exhibited and overlaid over one another. In this manner, one can detect (using two different methodologies and uses) the visual exhibition of both to best determine the location of a metal or electrical target.

16 Claims, 5 Drawing Sheets

MAGNETIC FIELD DETECTOR AND GROUND-PENETRATING RADAR DEVICE WITH MERGED DISPLAY

FIELD OF THE DISCLOSED TECHNOLOGY

The disclosed technology relates generally to ground-penetrating radar (GPR) and very low frequency (VLF) transmission for purposes of detecting magnetic fields.

BACKGROUND OF THE DISCLOSED TECHNOLOGY

GPR, or ground-penetrating RADAR (where RADAR is "RAdio Detection And Ranging), is a technology used to assess the composition and location of heterogeneous materials. GPR uses radio frequencies and is particularly useful in that it is both non-destructive and non-ionizing. In fact, GPR uses frequencies similar to a cellular phone, but at far lower power levels. Common applications include locating the precise position of rebar within a concrete wall/floor, identifying and locating buried objects underground, assessing the quality and uniformity of an asphalt or concrete highway surface, and detecting deterioration on bridge decks. In road surface applications, GPR is used, for example, to detect cracks, fissures, or contamination in any one of the chip seal, pavement layers, gravel base, and so forth. In many roadway applications, a resolution of features of the road surface of less than one inch (2.54 cm) is desired. Such systems may be mounted on vehicles traveling over the surface while acquiring measurement data. GPR systems are disclosed in more detail in U.S. Pat. No. 5,499,029 to Bashforth, et al., and U.S. Pat. No. 5,384,715 to Lytton, which are hereby incorporated by reference.

Ground Penetrating Radar (GPR) antennas are built in different sizes for different uses. Smaller antennas are generally higher in frequency, have higher resolution for displaying finer details, and are not able to penetrate as deep as lower frequency antennas. Larger antennas are generally lower in frequency, are able to penetrate deeper, but have a lower resolution, and so are not able to discriminate fine details. By performing a survey simultaneously with two antennas, a higher and a lower frequency model, the user is able to obtain the best quality of each antenna. The volume near the surface will have the best resolution, and the deeper volume will be viewed with the maximum range. Viewing the two separate pictures displayed can be difficult for the average user, even when viewed on the same monitor, as is the best practice currently known.

Further, alternating current carrying conductors (i.e., utility power lines) produce magnetic fields which can be detected with an transducer at proper frequencies. For detection of pipes, one can induce a signal onto the pipe or adjacent "tracer line" to aid in its detection. Typically, a magnetic field is detected from a power lines at 50 or 60 Hz, while the induced case uses higher frequency signals ranging from a few hundred Hz up to several hunded KHz. The magnetic field produced therefrom extends radially outwards from the direction of current flow. Examples of same include U.S. Pat. No. 8,742,747 to Pearson, U.S. Pat. No. 7,113,124 to Waite, and U.S. Pat. No. 8,188,745 to Overby, et al.

Each method of detection in the prior art has different drawbacks. Different types of interference affect the use of each one, causing false positive results or failing to locate the desired object. There is a need in the art to find better ways of detecting buried pipes, electrical lines, and other cables.

SUMMARY OF THE DISCLOSED TECHNOLOGY

In embodiments of the disclosed technology, a visual output of data from both ground-penetrating radar and a very low frequency receiver are displayed on a visual display. The display includes a first exhibition of output from an antenna used as a component of the ground-penetrating radar and a second exhibition of output from an antenna used of a component (electrically connected or coupled device) of the very low frequency receiver. The second exhibition is overlaid over the first exhibition, such that at least one axis of the first exhibition and the second exhibition is of substantially identical magnitude.

"Substantially," for purposes of this disclosure, is defined as "within a tolerance level of 5% or less." It should also be understood that any device or element claims can "be comprised of," or "consist of" the parts there listed, based on the claimed terminology. Further, the term "and/or" should be construed as meaning either or both terms joined by the phrase.

The axis described can be one or both of a measure of distance and/or time. Each point of the at least one axis for both the first exhibition and the second exhibition can correspond to a specific coordinate on the earth, where a measurement is made with the ground-penetrating radar and the very low frequency receiver. The first exhibition (that of the GPR) can be divided into output from a higher frequency range antenna and a lower frequency range antenna, each sharing at least one axis in the output.

The very low frequency receiver outputs magnetic field data along three axes which are outputted with each in a different color, while the GPR exhibition in the output is in a fourth distinct color. A "distinct" color, for purposes of this disclosure, is defined as one which is recognizable by an operator of the device as being different from other colors displayed there-on. These distinct colors can be those having a hexadecimal value of at least 33 different from each other in at least one of the red, green, and blue spectrum in an RGB color scheme.

An upside-down U-shape exhibited in the first exhibition and a peak overlaid at a same location in the X-axis indicates detection of a buried target object (a metal object such as a conduit-type pipe or electrical cable), in embodiments of the disclosed technology.

A device of embodiments of the disclosed technology includes a ground-penetrating radar device, a very low frequency receiver, and a visual display. The ground-penetrating radar device and the very low frequency receiver operate simultaneously. The visual display displays substantially simultaneous output from the ground-penetrating radar device and the very low frequency receiver. Such output is overlaid one on top of the other.

The visual display includes an axis with a measure of distance or time with output of the ground-penetrating radar device and the very low frequency receiver outputted together at corresponding measures of distance and/or time. The simultaneous output from said ground-penetrating radar device includes simultaneous output from said different ground-penetrating radar measurements, a first at a higher frequency and a second at a lower frequency.

A transition area between the simultaneous output from different ground-penetrating radar measurements can be exhibited as comprising merged data from each of the various ground-penetrating radar measurements. The very low frequency receiver can output magnetic field data along three axes. Each axis of the three axes is exhibited in a distinct color, while output from the ground-penetrating radar is exhibited in a fourth distinct color. In this manner, each magnetic field direction, as well as the radar output, can be simultaneously viewed for a single location. The very low frequency transmitter induces a magnetic field between 512 Hz and 100 kHZ, in embodiments of the disclosed technology.

Further features of the device, described above, are also applicable to the method of use.

DETAILED DESCRIPTION OF EMBODIMENTS OF THE DISCLOSED TECHNOLOGY

In an embodiment of the disclosed technology, a visual output of data from a ground-penetrating radar and magnetic field measuring device is displayed on a visual medium. The display has a first exhibition of output from the ground-penetrating radar device and a second exhibition from a magnetic field measuring device, such as a very low frequency (VLF) receiver. Using an identical axis, such as an X-axis measuring time or distance, output of each device is exhibited and overlaid over one another. In this manner, one can detect the use of two different methodologies and the use of the visual exhibition of both, in order to best determine the location of a buried target.

Embodiments of the disclosed technology will become clearer in view of the following description of the figures.

Figure 1:
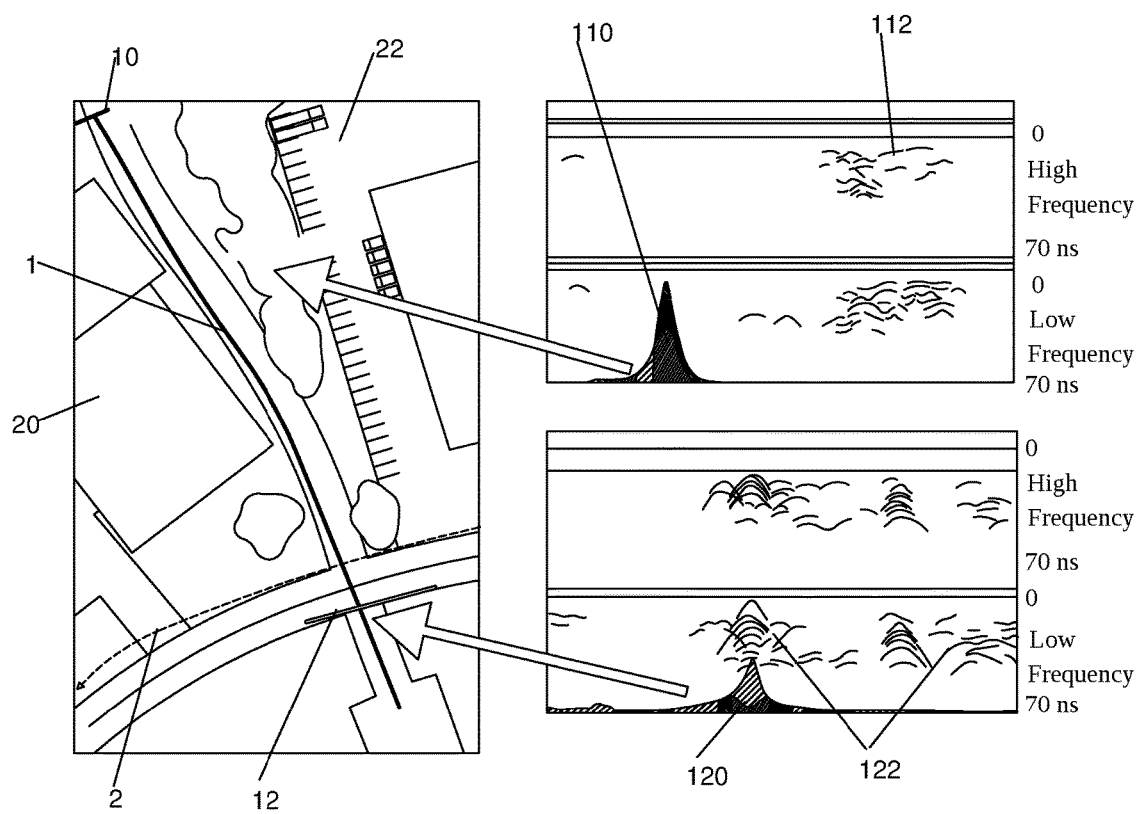
FIG. 1 shows sample output graphs of data generated by two ground-penetrating radar antennas and a magnetic field measuring device, in an embodiment of the disclosed technology.

FIG. 1 shows sample output graphs of data generated by a dual-frequency ground-penetrating radar antenna and a magnetic field measuring device, in an embodiment of the disclosed technology. The left box shows a map, for purposes of showing a path of travel using devices of the disclosed technology. In this map there are a building 20, a parking lot 22, and a buried power cable 1. This cable coincidentally emits a 60 Hz magnetic field. The location of the pipe, or parts thereof, is unknown, in embodiments of the disclosed technology. Another object which can be detected, or may interfere with the detection of the desired object is an overhead electrical wire 2. As this wire emits its own electromagnetic waves, this can be detected, willfully or unwillfully, when using a magnetic field measuring device.

As a person moves along path 10, he or she crosses over buried electrical cable 1. This is represented on the graph/plot/visual output at the top right, which shows the magnetic field data output 110. This output is in three different distinct colors representing the direction of the magnetic field in the X, Y, and Z axes respectively. That is, for a person walking across the cable, the X axis would be in the direction he or she is walking and the opposite direction thereof, the Y axis would be moving upwards and downwards with respect to the ground the person is walking across, and the Z axis would be transverse (90 degrees offset) from the X axis, while still extending across the surface of the ground. Thus, by way of the visualization shown, one can determine through the color coding (represented by different hatch lines for each color) in which direction the field is strongest, and thereby also determine a direction of travel of the pipe, based on the resultant magnetic field propagation. The larger the area under the line for a specific axis, the larger the magnetic field detected over a period of time. The peak (or null in the middle of a peak in the case of a precisely aligned field) of a magnetic field direction on the graph represents the highest magnetic field found, and typically signifies a closest location to a detected object emitting electromagnetic waves. That is, the detection device is likely oriented such that the antenna is pointing directly or substantially directly at the cable. The position where an abrupt change in direction of the magnetic field occurs strongly indicates of the location of the cable.

Still referring to FIG. 1, note that in the upper graph the ground-penetrating radar data 112 is not aligned with the magnetic field data 110. Where the X-axis on the graph represents time and/or a distance of travel (whereby one or both of time and distance is plotted linearly) a magnetic field is clearly detected in one position, but the ground-penetrating radar system detects unrelated clusters of noise only at a different X position. This is an example of the GPR system failing to detect the pipe, which commonly occurs under difficult soil conditions. Hence, the backup of detection of the magnetic field is needed to locate the object 1, but rule out the location seemingly detected in the GPR data 112 as the cable location.

Referring now to the graphs shown in general, the GPR data is merged and shown from output of two antennas—a low frequency antenna and a high frequency antenna. It should be understood that in other embodiments only one antenna is used. U.S. Pat. No. 8,957,809 to Cist is hereby explicitly incorporated by reference which discusses Ground Penetrating Radar and merger of different outputs based on a detected transition area. Such devices and systems described in the '809 patent can be used in conjunction with embodiments of the disclosed technology.

Referring again to FIG. 1, note the path of travel 12 which passes over a different buried object,—a utility gas line that has been actively induced at 32,768 Hz. Here, note that the GPR data 122 show peaks of output at the same X position as a magnetic field 120, as well as other output at different positions. The place where the magnetic field 120 peaks, which also corresponds to some of the GPR peaks (such as one or a plurality of cascaded upside down letter "U" or "V") confirms, via both systems, that a buried gas line has been detected. The location of the gas line in now clearly identified and discernible from the numerous other GPR targets for which the user is not looking.

Figure 2:
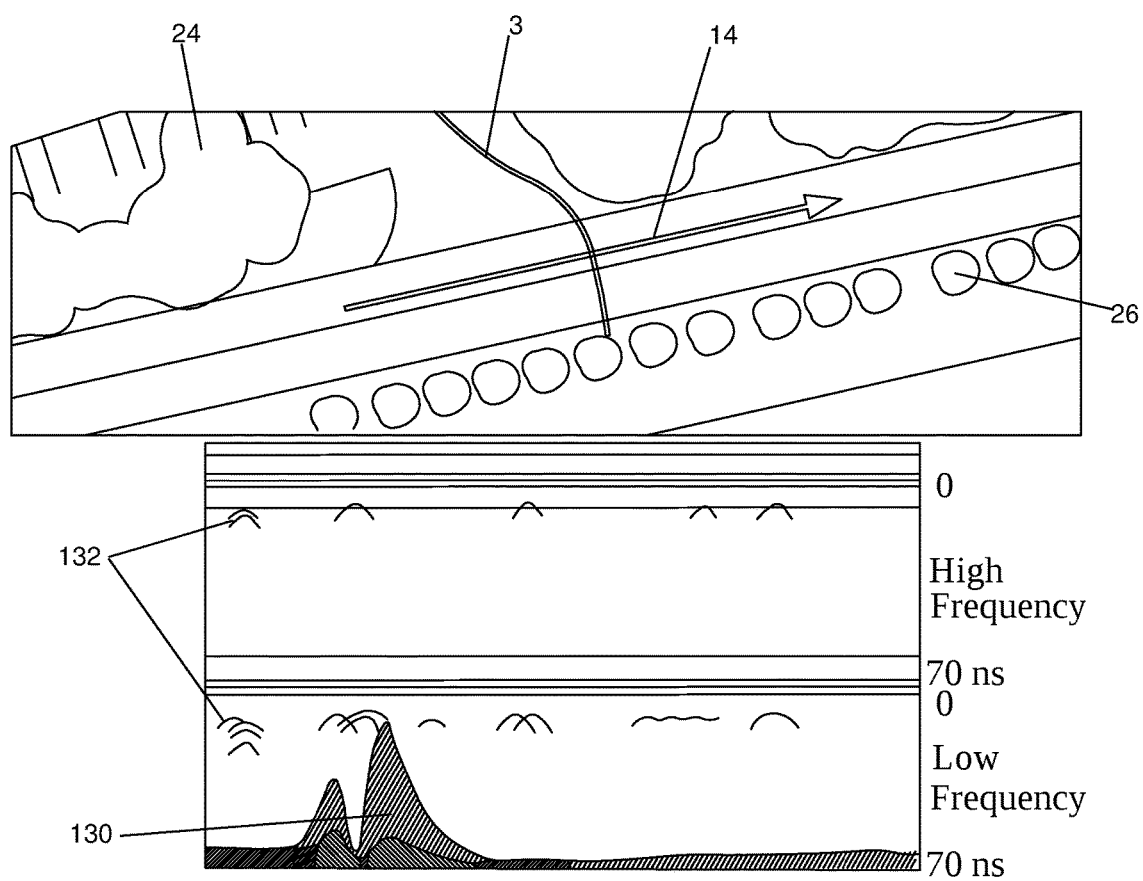
FIG. 2 shows a sample output graph of data generated by two ground-penetrating radar antennas and a magnetic field measuring device, where a positive result is detected only by the magnetic field measuring device, in an embodiment of the disclosed technology.

FIG. 2 shows a sample output graph of data generated by two ground-penetrating radar antennas and a magnetic field measuring device, where a positive result is detected only by the magnetic field measuring device, in an embodiment of the disclosed technology. Here, the various peaks from different orientations of the magnetic field 130 are more easily seen. A person carries, rolls, or otherwise transports a device with GPR and VLF along path 15 between some bushes 24 and 26 on a road. One can see a null in the highest peaks on the magnetic field 130 corresponding to some positive matches from the GPR 132, namely, the peaks within the GPR data output over the peaks of the magnetic output. This serves as confirmation based on the exhibition of the data outputted from each system.

Figure 3:
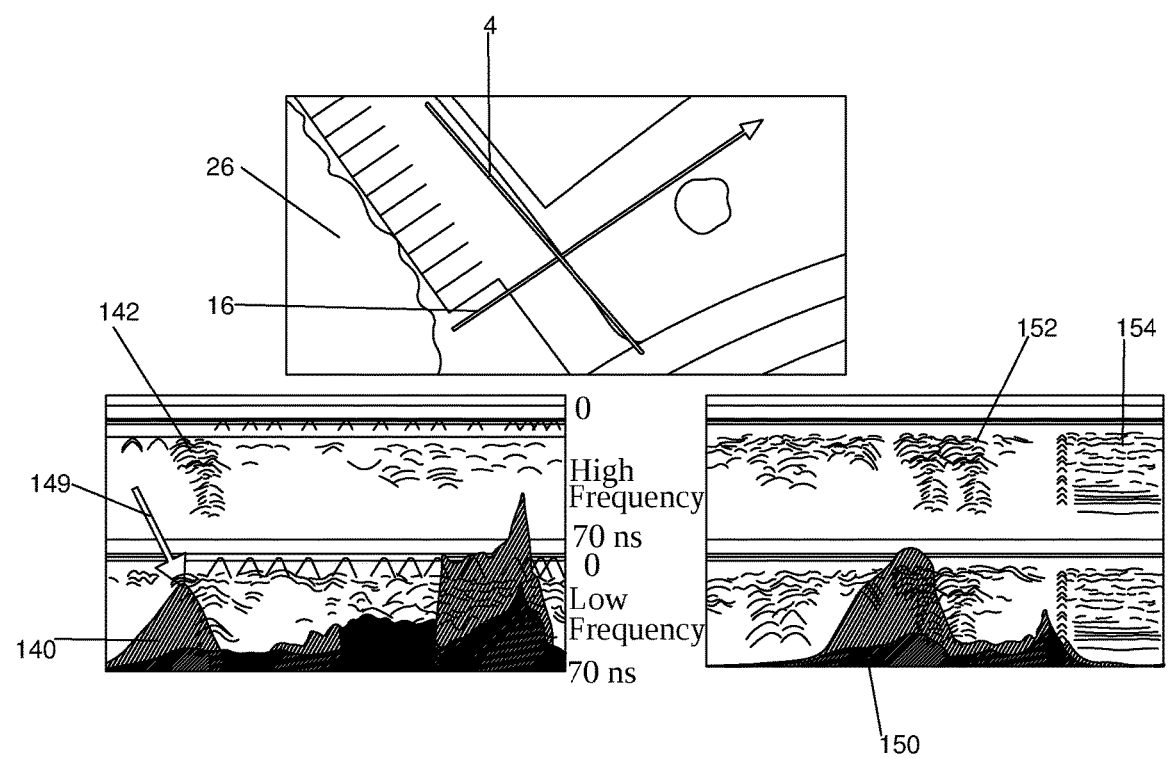
FIG. 3 shows a sample complex output graph of data generated by two ground-penetrating radar antennas and a magnetic field measuring device, in an embodiment of the disclosed technology.

FIG. 3 shows a sample complex output graph of data generated by two ground-penetrating radar antennas and a magnetic field measuring device, in an embodiment of the disclosed technology. Here, the top map picture shows topography 26, a path of two different overlapping pipes or electrical conductors 4, and a walking path 16. The person or device walking over the path 16 passes over the electrical conductors 4, which are largely (more than 50%) overlaid over one another or within a few feet of each other, when viewed from directly above. For purposes of this disclosure, "up" or "above" refers to "in a direction towards the sky," whereas "down" or "below" refers to a direction towards the center of the earth. When used to refer to a screen, it is assumed that the bottom of the screen is facing towards the center of the earth.

In the images below the map in FIG. 3, which are drawn from actual output when tested, one can see the GPR output 142 from both high and low frequency antennas. At the X-axis point where arrow 149 points, one can see there is both a peak of magnetic field data 140 and much clear activity (upside down U's or V's or cascading waves) as one moves up and down the Y-axis at this point. This is an indication of a target, the induced tracer wire of gas line 4. Note that an even higher magnetic field peaks near the right side of the graph which indicate additional conductors that obfuscate the detection environment for the magnetic field sensor, alone. The magnetic field also alternates between being displayed in yellow and purple as the phase changes while passing over the gas line.

The left output represents a pass over a sidewalk with rebar, which causes interference. The right picture shows another slightly different pass next to the sidewalk. Note that, in the right picture, the magnetic field 150 peaks differently and, combined with the GPR output comprising of a useful data portion 152 and a largely noise portion 154 (defined as a portion of the output with noticeable changes in the output but without meaningful information being detected there-in), one can have a more accurate reading. In this case, the change in direction of the magnetic field indicates the target position, but confirmed by response 142 in the GPR data. This is a particularly complicated scenario that is only resolved by the combined use of complex-mode magnetic field sensing and GPR. The two outputs complement each other, so that the observer can understand each better by having more simultaneous data at their disposal.

Figure 4:
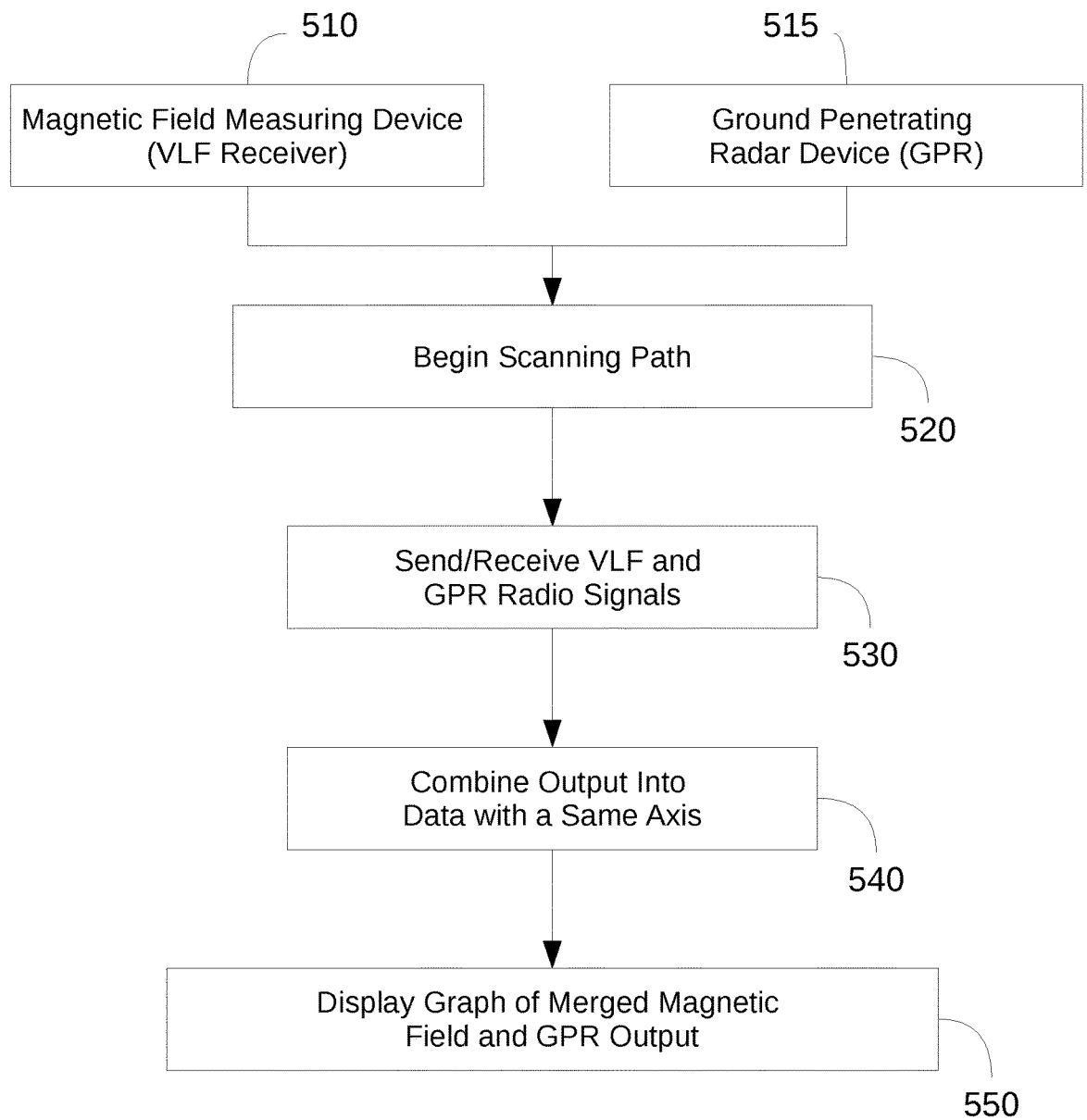
FIG. 4 is a high-level flow chart of steps taken to produce a graphical GPR and magnetic field output, in embodiments of the disclosed technology.

FIG. 4 is a high-level flow chart of steps taken to produce a graphical GPR and magnetic field output in embodiments of the disclosed technology. One uses a magnetic field measuring device which can measure at very low frequency. Such a device, represented by box 510, measures from 512 hertz to 50 kilohertz and is often used to induce a magnetic field which radiates outward there-from. A utility locater transmitter (a device designed to locate utility wires via radio or electrical signal) can also be electrically coupled and/or used with devices and systems of the disclosed technology at frequencies such at 1, 8, or 33 kilohertz. An alternating current (AC) detector module can also be used therewith at frequencies from 50 hertz to 300 kilohertz. Two tones can simultaneously be detected across a three spatial axis, such as at 60 hertz and 33 kilohertz, simultaneously. One further uses a ground-penetrating radar device 515 which has been further described in the background, and in the patent which has been incorporated by reference, above.

The physical device used comprises both the VLF receiver 510 (or other device measuring magnetic fields) and the ground penetrating radar device 515 together, using clock and display functions for output of each, such as displaying the output shown in any one of FIGS. 1 through 3. One then begins to scan in step 520, such as along the paths shown in FIGS. 1 through 3. This is accomplished by walking or rolling the device from a starting point to a finishing point, while simultaneously sending and receiving VLF and GPR radio signals in step 530. The output of the data from the devices 510 and 515 is then combined in step 540, using a common time and/or distance measure, such as in a database where a time is listed along with data representative of output from each of the devices 510 and 515 at the specific time. This data is then, in step 550, displayed on a graph with merged magnetic field and GPR output, as already shown in prior figures.

Figure 5:
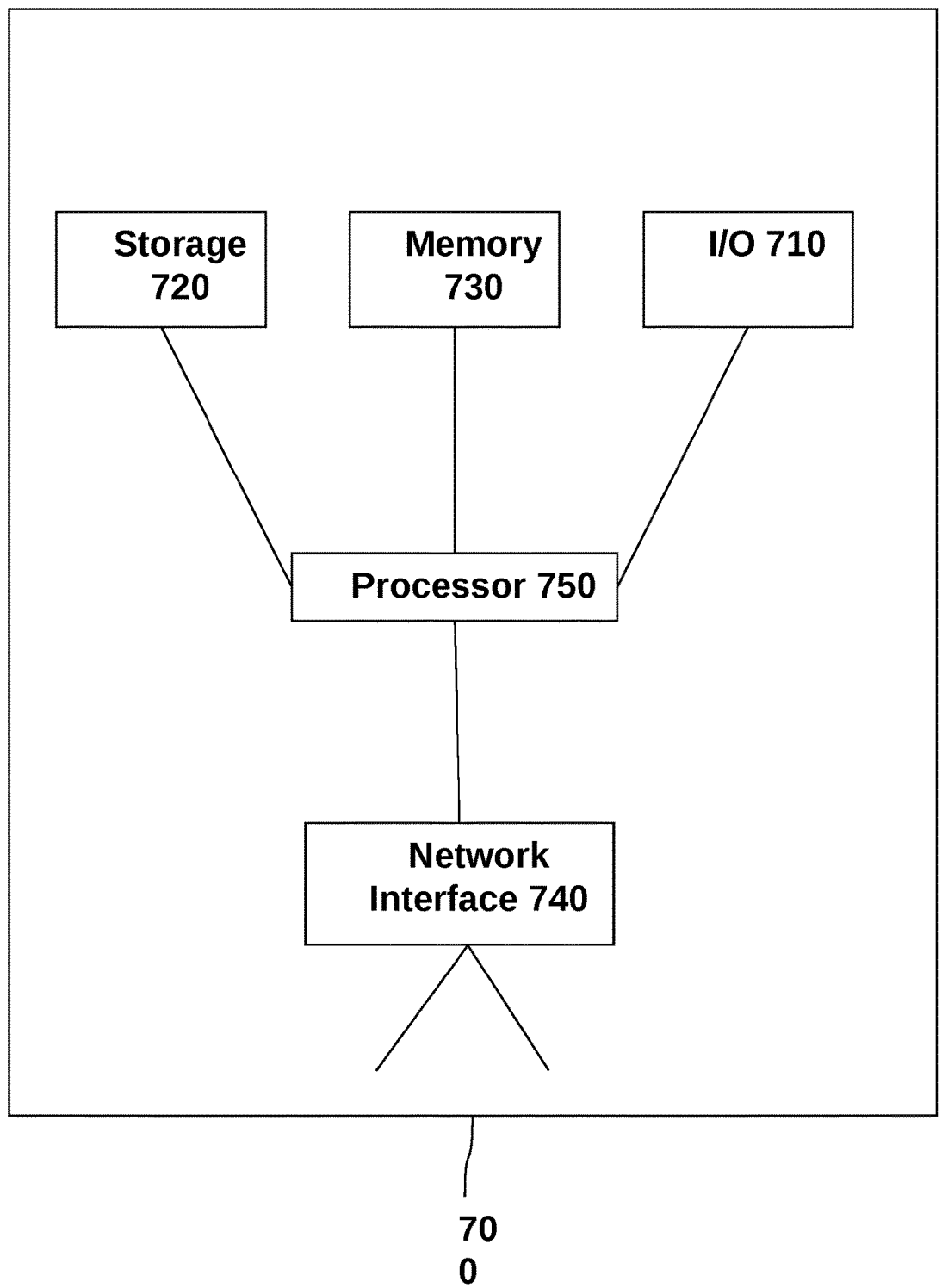
FIG. 5 shows a high-level block diagram of a device that may be used to carry out the disclosed technology.

FIG. 5 shows a high-level block diagram of a device that may be used to carry out the disclosed technology. Device 700 comprises a processor 750 that controls the overall operation of the computer by executing the measurement device's program instructions which define such operation. The measurement device's program instructions may be stored in a storage device 720 (e.g., magnetic disk, flash disk, database) and loaded into memory 730 when execution of the measurement device's program instructions is desired. Thus, the measurement device's operation will be defined by the measurement device's program instructions stored in memory 730 and/or storage 720, and the measurement device will be controlled by processor 750 executing the measurement device's program instructions. A device 700 also includes one or a plurality of input network interfaces for communicating with other devices via a network (e.g., the internet). A device 700 also includes one or more output network interfaces 710 for communicating with other devices. Device 700 also includes input/output 740 representing devices which allow for user interaction with the computer 700 (e.g., display, keyboard, mouse, speakers, buttons, etc.). One skilled in the art will recognize that an implementation of actual devices will contain other components as well, and that FIG. 7 is a high level representation of some of the components of such a measurement device for illustrative purposes. It should also be understood by one skilled in the art that the method and devices depicted in FIGS. 1 through 4 may be implemented on a device such as is shown in FIG. 5.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only illustrative and not restrictive. All changes that come within the meaning and range of equivalency of the claims are to be embraced within their scope. Combinations of any of the methods, systems, and devices described hereinabove are also contemplated and within the scope of the invention.

I claim:

1. A method for providing a visual output of data, the data collected using a mapping device, the mapping device including a ground-penetrating radar (GPR) having a GPR antenna and a very low frequency (VLF) receiver having a VLF antenna, the mapping device being functionally associated with a visual display, said method comprising:

moving said mapping device from a starting point to a finishing point;

during said moving of said mapping device, simultaneously sending and receiving GPR and VLF signals, said received VLF signals representing magnetic field data; and displaying on said visual display a first exhibition including output from said GPR antenna and a second exhibition including output from said VLF antenna, wherein said second exhibition is overlaid over said first exhibition, such that at least one axis of said first exhibition and said second exhibition are of substantially identical magnitude.

2. The method of claim 1, wherein said at least one axis is a measure of distance or time.

3. The method of claim 2, wherein each point of said at least one axis for both said first exhibition and said second exhibition corresponds to a specific coordinate on the earth where a measurement is made with said ground-penetrating radar and said very low frequency receiver.

4. The method of claim 2, wherein said displaying comprises dividing said output from said GPR antenna of said first exhibition into output from a higher frequency range antenna and output from a lower frequency range antenna, each sharing at least one axis in said output.

5. The method of claim 1, wherein said receiving VLF signals comprises receiving signals from said very low frequency receiver representing magnetic field data along three axes.

6. The method of claim 5, wherein said displaying comprises displaying each axis of said three axes in a distinct color, and displaying said first exhibition in a fourth distinct color.

7. The method of claim 6, further comprising, detecting the presence of a buried object at a location corresponding to a location on said visual display at which an upside-down U-shape of said first exhibition and a peak of said second exhibition are overlaid at a same location along said at least one axis.

8. A device comprising:

a ground-penetrating radar (GPR) device including a GPR antenna;

a very low frequency (VLF) receiver, including a VLF antenna receiving signals representing magnetic field data; and a visual display; wherein said ground-penetrating radar device and said very low frequency receiver operate simultaneously at a specific location, to receive radio signals via said GPR antenna and signals representing said magnetic field data via said VLF antenna; and said visual display displays substantially simultaneous output from said GPR antenna and from said VLF antenna overlaid one on top of the other.

9. The device of claim 8, wherein said visual display includes an axis with a measure of distance or time with output of said ground-penetrating radar device, and said very low frequency receiver outputted together at corresponding measures of said distance or said time.

10. The device of claim 8, wherein said GPR antenna is adapted to receive different GPR measurements, a first at a higher frequency and a second at a lower frequency, and wherein said simultaneous output from said GPR antenna includes substantially simultaneous output from said different ground-penetrating radar measurements at said higher frequency and said lower frequency.

11. The device of claim 10, wherein said visual display displays a transition area between said substantially simultaneous output from said different ground-penetrating radar measurements, the transition area comprising merged data from all said different ground-penetrating radar measurements.

12. The device of claim 8, wherein said output from said VLF antenna includes a signal representing said magnetic field data along three axes.

13. The device of claim 12, wherein said display device displays each axis of said three axes in a distinct color, and displays output from said ground-penetrating radar in a fourth distinct color.

14. The device of claim 13, wherein display of an upside-down U-shape said output corresponding to a peak overlaid at a same location along at least one said axis indicates detection of a buried metal object.

15. The device of claim 14, wherein said very low frequency receiver induces a magnetic field between 512 Hz and 300 kHz.

16. The method of claim 6, further comprising identifying a greatest area under a curve of a distinct color, thereby to determine a direction of travel of an electrical current in a buried conductor.

* * * * *